Figure 1:
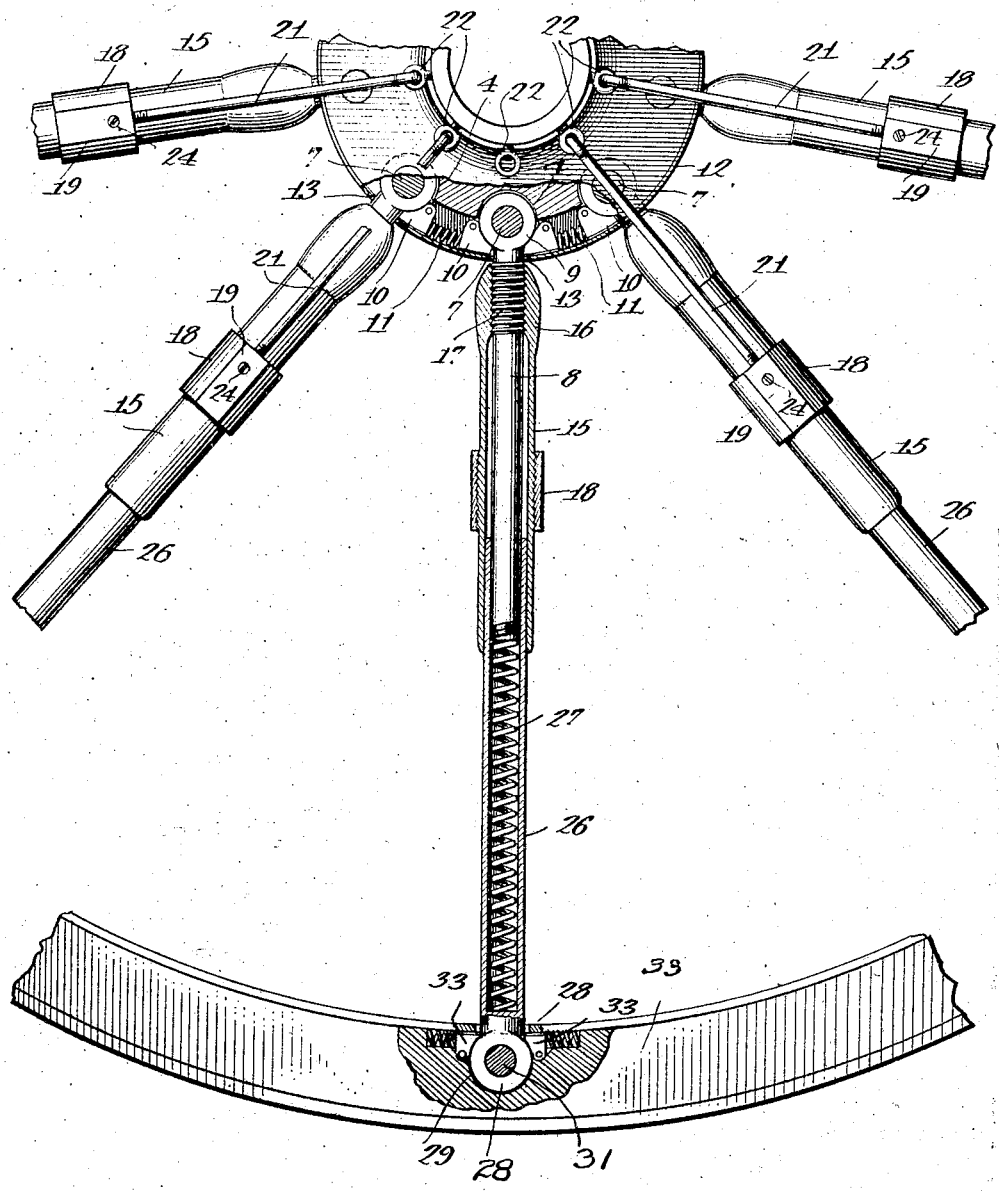

E. EAST.
SPRING WHEEL.
APPLICATION FILED APR. 27, 1911.

1,024,977.

Patented Apr. 30, 1912.
2 SHEETS—SHEET 1.

WITNESSES

INVENTOR
Elvin East

E. EAST.
SPRING WHEEL.
APPLICATION FILED APR. 27, 1911.
1,024,977.
Patented Apr. 30, 1912.
2 SHEETS—SHEET 2.
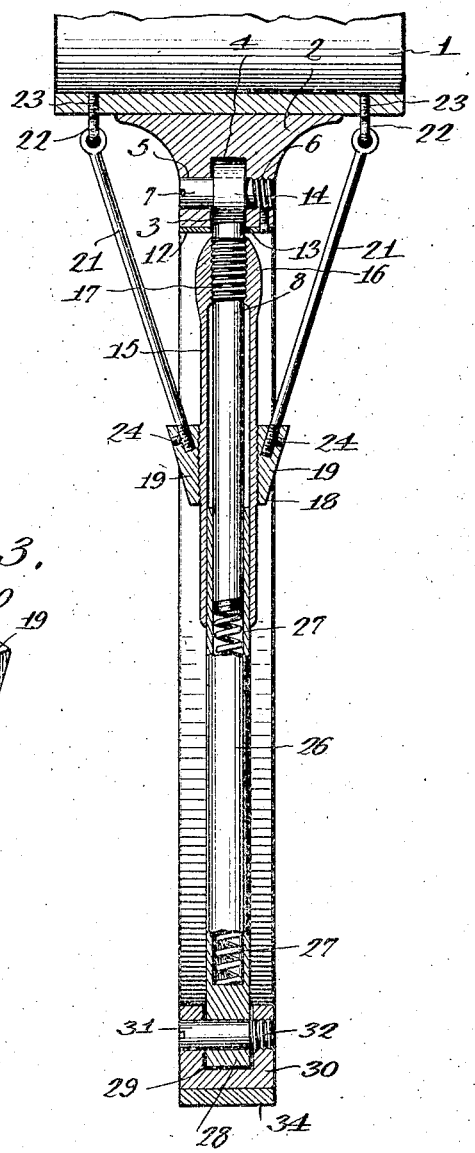
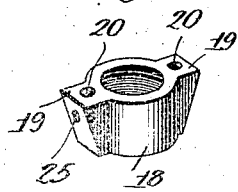
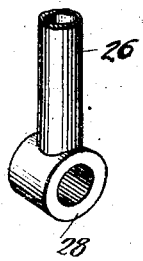
WITNESSES
Irv. L. McCathran
Ross Woodward
INVENTOR:
Elvin East
By C. E. Vrooman,
his Attorney

UNITED STATES PATENT OFFICE.

ELVIN EAST, OF SHEFFIELD, ALABAMA.

SPRING-WHEEL.

1,024,977.

Specification of Letters Patent. Patented Apr. 30, 1912.

Application filed April 27, 1911. Serial No. 623,665.

*To all whom it may concern:*

Be it known that I, ELVIN EAST, a citizen of the United States, residing at Sheffield, in the county of Colbert and State of Alabama, have invented certain new and useful Improvement in Spring-Wheels, of which the following is a specification, reference being had therein to the accompanying drawing.

This invention relates to spring wheels and the principal object of the same is to provide a wheel which will have the same resiliency as a wheel provided with a pneumatic tire.

The second object of the invention is to so construct the parts of the wheel that they will be dust proof, it being particularly desirous to provide the opening through which the spoke enters the hub with a device to prevent dust from entering the same.

Another object of the invention is to provide the outer ends of the spokes with braces which will prevent the spokes from having any pivotal movement.

This invention is illustrated in the accompanying drawings, wherein:—

Figure 1 is a fragmentary view of a spring wheel constructed in accordance with this invention. Fig. 2 is a sectional view through a portion of the improved wheel. Fig. 3 is a perspective view of one of the collars which is mounted upon the spokes. Fig. 4 is a perspective view of the outer end of one of the spokes.

This wheel comprises a hub 1, which is provided with an enlarged central portion 2. This central portion 2 is provided with an annularly extending groove 3 in the inner edge of which there is provided a number of equally spaced circular sockets 4. The enlarged portion 2 is provided with a transverse opening 5 positioned to pass through the central portion of each of the sockets 4. These transverse openings 5 each have one end 6 threaded as shown in Fig. 2 for the reception of a pivot pin 7, which passes through the opening and is threaded into the threaded end of the opening.

The spokes each comprise an inner section 8, which is provided with an enlarged circular pivot end 9 which is seated within one of the sockets 4, and is held in place by the pin 7. A sealing member 10 is positioned to each side of the spokes and is pivotally mounted between the walls of the groove 3. These sealing members are held in contact with the spoke by means of springs 11 which are positioned between the sealing members and hold the same in place.

A band 12 which is provided with the openings 13 is placed upon the central portion 2 of the hub with the spokes passing through the openings 13, and is held in place by the screws 14. From an inspection of Fig. 1, it will be readily seen that these sealing members completely close the openings 13 to each side of the spokes, and while they permit the spokes to have a certain amount of pivotal movement they do not leave any opening through which dust can enter the groove 3, and, thus cause the wheel to work badly.

A dust sleeve 15 is provided with a thickened inner end 16 which is threaded upon the threaded portion 17 of the inner portion of each spoke. A collar 18 is threaded upon the sleeve 15 intermediate its length, and is provided with oppositely disposed lugs 19 which are provided with sockets 20. The braces 21 are provided with screw-eyes 22 which are threaded into openings 23, formed in the hub 1 and have their other ends inserted within the sockets 20 and are held in place by means of the securing pins 24 which pass through the pin holes 25 formed through the lugs 19.

A hollow outer spoke section 26 is mounted upon each of the inner spoke sections 8 and passes between the spoke section 8 and the dust sleeve 15. A coil spring 27 is positioned within the outer spoke 26, and has one end secured to the end of the spoke section 8.

The outer end of each of the spoke sections 26 is provided with an enlarged sleeve 28 which fits within a socket 29 formed in the rim 30 of the wheel and is held in place by a pin 31 which passes transversely through the rim and has its threaded end 32 secured in the rim. The rim is provided with a pair of pivotally mounted spring held lugs 33 which engage the spoke from each side of the socket 29 and brace the spoke section 26 so as to limit the pivotal movement of the spoke in the socket. A tire 34 of any desired material is placed upon the rim.

After this device has been assembled the outer spoke sections have a free movement between the inner spoke section 8 and the sleeve 15, so that any jar can be taken up by the spring which is positioned within the section 26. The dust sleeve 15 prevents any dust from getting within the section 26, so that the spring is thus protected. The spokes can have a certain amount of pivotal movement within the hub but the sealing members 10 prevent any danger of dust getting within the hub and injuring the wheel.

What I claim is:—

1. A wheel comprising a hub having an annular groove and a plurality of sockets formed in the inner wall of said groove, spokes pivotally mounted within said sockets, a plate mounted upon said hub and provided with a plurality of openings through which said spokes pass, a sealing member positioned upon each side of each of said spokes, springs positioned between said sealing members to normally hold said sealing members in a position to close said openings through which said spokes pass, and a rim secured to the outer ends of said spokes.

2. A wheel comprising a hub provided with a groove in its periphery, spokes pivotally mounted in said groove, a plate mounted upon said hub and provided with openings through which said spokes project, sealing means pivotally mounted in said groove to each side of said spokes, means for normally holding said sealing means in contact with said spokes, and a rim connected with the outer ends of said spokes.

3. A wheel comprising a hub provided with a groove in its periphery, spokes pivotally mounted in said groove, substantially triangular sealing devices pivotally mounted in said groove to each side of each spoke, elastic means positioned between said sealing devices and normally holding said sealing devices in contact with said spokes and a band surrounding the periphery of said hub and provided with openings through which said spokes pass.

In testimony whereof I hereunto affix my signature in presence of two witnesses.

ELVIN EAST.

Witnesses:
 JAMIE SWIFT,
 WILL ALEXANDER.